United States Patent
Agrawal et al.

(10) Patent No.: US 10,721,668 B2
(45) Date of Patent: Jul. 21, 2020

(54) NETWORK VIRTUALIZATION OF USER EQUIPMENT IN A WIRELESS COMMUNICATION NETWORK

(71) Applicant: INTERNATIONAL BUSINESS MACHINES CORPORATION, Armonk, NY (US)

(72) Inventors: Dakshi Agrawal, Monsey, NY (US); Bruce O. Anthony, Jr., Pine Island, MN (US); Dinesh C. Verma, New Castle, NY (US); Mudhakar Srivatsa, White Plains, NY (US); Chatschik Bisdikian, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 17 days.

(21) Appl. No.: 15/851,938

(22) Filed: Dec. 22, 2017

(65) Prior Publication Data

US 2019/0200271 A1 Jun. 27, 2019

(51) Int. Cl.
*H04W 36/32* (2009.01)
*H04W 36/00* (2009.01)
*H04W 36/24* (2009.01)
*H04L 29/08* (2006.01)
*H04W 36/08* (2009.01)

(52) U.S. Cl.
CPC ......... *H04W 36/32* (2013.01); *H04L 67/1095* (2013.01); *H04W 36/0055* (2013.01); *H04W 36/245* (2013.01); *H04W 36/08* (2013.01)

(58) Field of Classification Search
None
See application file for complete search history.

(56) References Cited

U.S. PATENT DOCUMENTS

| 7,826,841 | B2 | 11/2010 | Lu et al. |
| 8,966,004 | B2 | 2/2015 | Connelly et al. |
| 9,201,674 | B2 | 12/2015 | Rogel et al. |
| 9,467,923 | B2* | 10/2016 | Karaoguz ............. H04W 36/32 |
| 2006/0111111 | A1* | 5/2006 | Ovadia ............... H04L 41/0213 455/439 |
| 2013/0288741 | A1 | 10/2013 | Sjadieh et al. |
| 2014/0259012 | A1* | 9/2014 | Nandlall ............... H04W 4/003 718/1 |

(Continued)

FOREIGN PATENT DOCUMENTS

WO 2012178055 A1 12/2012

OTHER PUBLICATIONS

Qi et al., "Research on Mobile Cloud Computing: Review, Trend and Perspectives," IEEE, 2012 (8 pages).

*Primary Examiner* — Hong S Cho
(74) *Attorney, Agent, or Firm* — Griffiths & Seaton PLLC

(57) ABSTRACT

Embodiments for network virtualization of user equipment (UE) in a wireless communication network. A trigger may be received from a user equipment (UE) indicating potential UE mobility away from a remote virtual machine (VM) instance on a host server collocated on an eNodeB in the wireless communication network. One or more identifiers (ID) of one or more potential host servers collocated on one or more alternative eNodeBs may be determined for receiving the UE. VM replication may be provided to the one or more potential host servers to enable continuation of the remote VM instance.

17 Claims, 7 Drawing Sheets

(56) References Cited

U.S. PATENT DOCUMENTS

| | | | |
|---|---|---|---|
| 2016/0044560 A1* | 2/2016 | Anschutz | H04W 36/08 |
| | | | 370/331 |
| 2016/0219409 A1* | 7/2016 | Cai | H04W 64/006 |
| 2017/0094466 A1* | 3/2017 | Bjorkengren | H04B 17/318 |
| 2018/0331846 A1* | 11/2018 | Meakin | H04L 12/2825 |

* cited by examiner

NETWORK VIRTUALIZATION OF USER EQUIPMENT IN A WIRELESS COMMUNICATION NETWORK

BACKGROUND OF THE INVENTION

Field of the Invention

The present invention relates in general to computing systems, and more particularly to, various embodiments for network virtualization of user equipment (UE) in a wireless communication network.

Description of the Related Art

In today's interconnected and complex society, computers and computer-driven equipment are more commonplace. Processing devices, with the advent and further miniaturization of integrated circuits, have made it possible to be integrated into a wide variety of devices for personal, business, health, home, education, scientific, or governmental related areas of interest. Accordingly, the use of computers, network appliances, and similar data processing devices continue to proliferate throughout society, particularly in the health and home environment.

Moreover, wireless mobile communication technology uses various standards and protocols to transmit data between a node (e.g., a transmission station) and a wireless device (e.g., a mobile device). Various standards and protocols for signal transmission include third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi. In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

SUMMARY OF THE INVENTION

Various embodiments for network virtualization of user equipment (UE) in a wireless communication network are provided. In one embodiment, by way of example only, a method for virtualizing a UE in a wireless communication, again by a processor, is provided. A trigger may be received from a user equipment (UE) indicating potential UE mobility away from a remote virtual machine (VM) instance on an edge server collocated on an eNodeB in the wireless communication network. One or more identifiers (ID) of one or more potential edge servers collocated on one or more alternative eNodeBs may be determined for receiving the UE. VM replication may be provided to the one or more potential edge servers to enable continuation of the remote VM instance.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
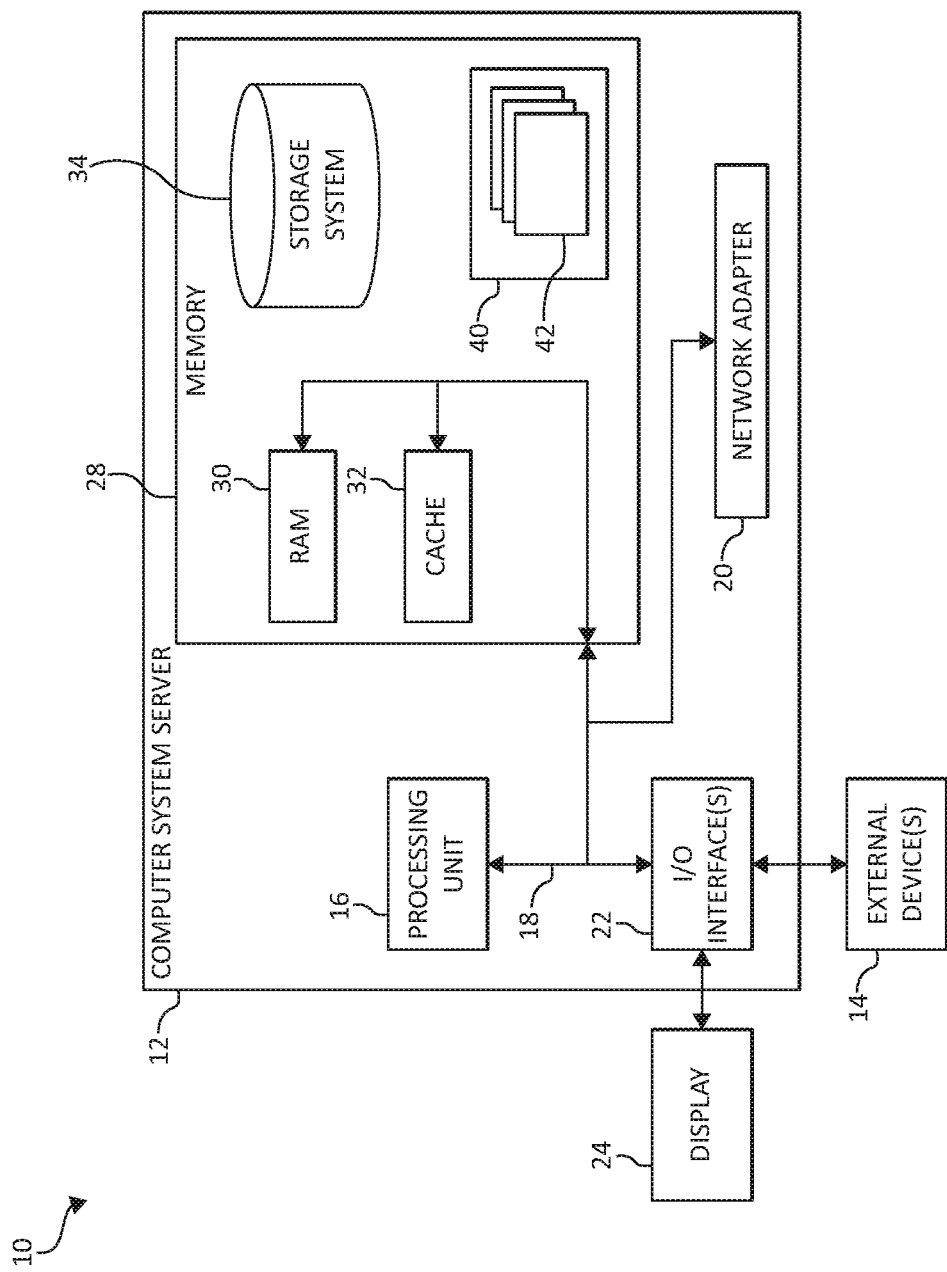
FIG. 1 is a block diagram depicting an exemplary computing node according to an embodiment of the present invention.

As the demand for improvements to computing systems and communication networks increase, cellular phones have evolved into "smartphones" that allow a user not only to make a call, but also to access data, such as e-mails, the internet, etc. Mobile phone networks have evolved as well to provide the data services that new mobile devices require. For example, third generation partnership project (3GPP) networks cover most of the United States and allow users high-speed wireless data access on their mobile devices. Many mobile phone companies provide equipment and services that allow a subscriber to plug a mobile access card into a Universal Serial Bus (USB) port on a laptop computer and provide wireless internet to the laptop computer through the mobile data network. In addition, some newer mobile phones allow the mobile phone to function as a wireless hotspot, which supports connecting several laptop computers or other wireless devices to the mobile phone, which in turn provides data services via the mobile data network.

Furthermore, many enterprises (e.g., businesses, organizations, government agencies, etc.) encourage the use of mobile smartphones in the workplace to increase productivity. In many industry sectors (e.g., finance, defense, etc.), enterprises may provide standardized smartphones belonging to the enterprise to employees, which are "locked down" and controlled by the enterprise thereby creating several issues and challenges. Such "locked down" smartphones have limited functionality, for example, the USB ports may be disabled, JavaScript® may be disabled in a web browser, software upgrades over popular marketplaces (e.g., marketplace websites) are disabled, and a variety of other functionalities. Such oversight may result in a standard set of enterprise applications and reduced support cost.

In addition, limited functionality practices may also address various security and liability concerns relating to an enterprise. However, these locked down smartphones may inconvenience many users desiring a customized and fully functional cellular device for both professional and personal usage without having to have multiple cell phones. Some industry practices enable employees to purchase and own personal smartphones and then install enterprise software on the personal phones to enable increased production while on the move. This approach also has several issues and challenges such as, for example: (a) enterprise applications need to be supported on many different operating software ("OS"); and/or (b) enterprise applications need to be potentially upgraded if the underlying OS or libraries are refreshed. To address these concerns, various aspects of the illustrated embodiments may be provided by: (a) delivering applications as platform agnostic as possible (e.g., a limited set of applications may be delivered as a web application in which case only a compliant web browser is required); and/or by (b) virtualizing mobile hardware by using a hypervisor. In the hypervisor, two "images" can be run—a personal image belonging to the user and another image for the enterprise. The user may be enabled to switch back and forth between these images and do their personal and enterprise/corporate work. However, these two approaches have additional challenges that also need to be addressed such as, for example: (a) not all applications can be delivered in a platform agnostic fashion and still provide the best user experience; and/or (b) two or more images running on the same smartphone requires more resources and/or if one image is quiesced, then switching back and forth between multiple images takes time, decreases computing efficiency, and becomes challenging to a user (e.g., quiesced image synching with the email server when woken up), and/or (c) cooperation of service providers may be required in many countries particularly where service providers tightly control the mobile devices. Some cell phone providers also exert tight control over devices provided by the cell phone provider and mobile virtualization requires cooperation from these service providers.

Thus, a need exists for network virtualization of user equipment (UE) in a wireless communication network. Accordingly, various embodiments are provided for network virtualization of a UE in a wireless communication network. A trigger may be received from a user equipment (UE) indicating potential UE mobility away from a remote virtual machine (VM) instance on an edge server collocated on an eNodeB in the wireless communication network. One or more identifiers (ID) of one or more potential edge servers collocated on one or more alternative eNodeBs may be determined for receiving the UE. VM replication may be provided to the one or more potential edge servers to enable continuation of the remote VM instance.

In one aspect, the UE can be a mobile station or user equipment units such as mobile telephones, also known as "cellular" telephones, and laptops with wireless capability, e.g., mobile terminals, and thus may be, for example, portable, pocket, hand-held, computer-included, or car-mounted mobile devices which communicate voice and/or data with radio access network.

In one aspect, a virtualized instance (e.g., virtualized mobile image) may be performed on an edge server operating in a cloud-computing environment. Each VM instance may correspond to a selected user accessible from the UE associated with the user. Thus, the actual VM instance is executing remotely from the UE and the UE is used as a display and input device. According, the present invention (a) enables all instances, including all enterprise applications, to be standardized and managed in a cost-effective manner; and (b) eliminates any requirements for substantial changes to the mobile device in order to accept installation of an application.

User mobility of mobile devices and low bandwidth of cellular connections present additional challenges that must be resolved so as to provide users a quality experience using the mobile devices (e.g., increase speed, efficiency, and use of the UE in a cellular network). For example, a large delay incurred in a cellular infrastructure network means large delays (e.g., 100 milliseconds ("ms") to 300 ms) between the mobile devices and cloud servers located in the Internet. This large delay spoils user experience since users expect instant response to user inputs. To reduce this delay, the present invention provides for cloud computing and protocols for remote desktop protocols ("RDP") that include: (a) placing one or more servers within a cellular network (e.g., at RNC or at the base station); (b) using a radio layer/handoff information to determine and/or estimate user motion; (c) preparing for VM migration according to the determined and/or estimated user motion; and (d) performing the VM migration in concert with user handoff to a next or predicted cell tower (e.g., eNodeB or basestation). In other words, the mechanisms of the illustrated embodiments provide one or more edge servers within the cellular network (e.g., at the edge of the cellular network) to host virtual images.

Moreover, to address the challenge of mobility in using the edge servers, as users move from one cell tower (e.g., eNodeB or basestation) to another, the virtual image may be relocated to the next edge server in one cell tower (e.g., eNodeB or basestation) to another cell tower (e.g., eNodeB or basestation). The radio layer information may be used to predict the user motion which may then predict future cell tower (e.g., eNodeB or basestation) attachment points of the mobile user. The VM may then be relocated to these future predicted edge servers on or within the cell tower (e.g., eNodeB or basestation). By using edge servers, the delay can be reduced down to 10 ms-30 ms, which can provide improved user experiences and computing/cellular efficiency even while using touch interfaces.

In an additional aspect, the host server may be collocated at a cell tower (e.g., eNodeB or basestation) along with radio area network (RAN) processing. The RAN layer passes signal strength/handoff information to a module/component on an edge server that predicts motions of the user based on historical patterns and user profiles. Based on the motion of the user, one or more cell towers (e.g., eNodeBs or basestations) may be identified as the next attachment point (most likely attachment point based on a percentage, historical patterns, or ranked order) for a user. Also, a time for performing the change of attachment may also be predicted.

Based on the predicted time and next likely attachment points (e.g., those eNodeBs or basestations having a greater percentage for receiving the UE as compared to other eNodeBs or basestations), VM migration may be started and/or performed in the background. This background VM migration process may complete most (e.g., greater than 50%) of the VM migration task. Upon actual change of attachment point, a small amount of data may be transferred to the next attachment point (e.g., an eNodeB or basestation) and provide continuous service to the end user.

It should be noted that VM replication may also be used where the VM in a prior or previous attachment point (e.g., an eNodeB or basestation) is not cleaned. This stale image may later be used to speed up VM state replication by exploiting redundancies in stale and a latest or current VM. In an additional aspect, in addition to using user profiles and motion patterns to predict user mobility, actual signaling such as, for example, micro-diversity, may be used where two adjacent attachment points (e.g., an eNodeB or basestation) can hear the UE because the UE is in an overlap region from the attachment point (e.g., an eNodeB or basestation) to the next attachment point (e.g., an eNodeB or basestation). This situation may trigger a handoff operation and also be utilized to proactively initiate a VM state replication (e.g., in addition to the handoff).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment or Internet of Things (IoT) network environment. Rather, embodiments of the present invention are capable of being implemented in conjunction with any other type of computing environment now known or later developed. It should be noted that the IoT is an emerging concept involving computing devices that may be embedded in objects, such as appliances, and connected through a network. An IoT network may include one or more IoT devices or "smart devices", which are physical objects such as appliances with computing devices embedded therein. Many IoT devices are independently operable, but they also may be paired with a control system or with a distributed control system such as one running over a cloud computing environment. The control system may include an end-to-end flow monitoring mechanism similar to the one described herein.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/ server 12, which is operable with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
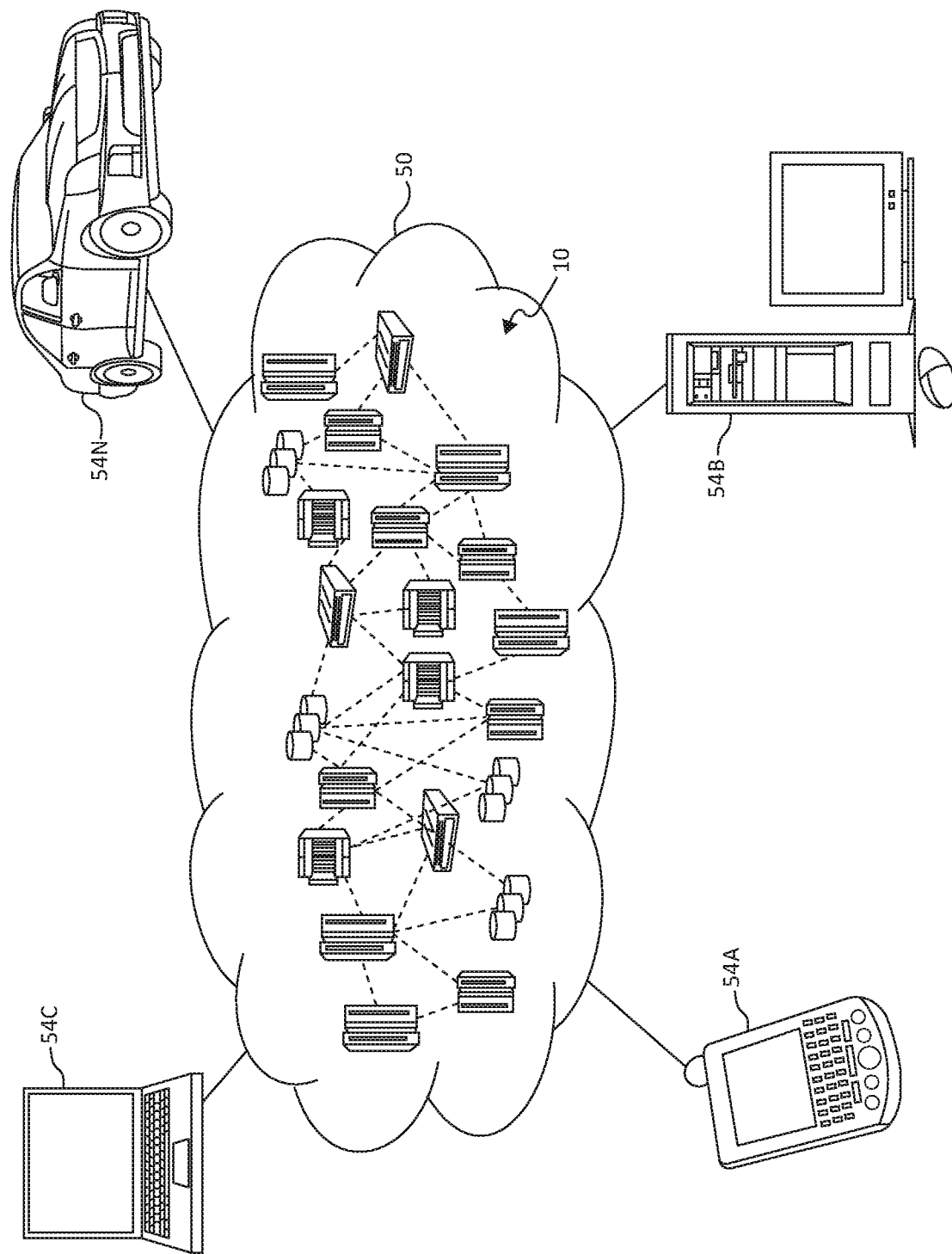
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, an intelligent ("smart") mattress 54D, and/or automobile computer system 54N may communicate. As used herein, a mattress such as, for example mattress 5D may be a pad, mat, cushion, foam, or object designed for supporting or reclining all or portions of a body such as, for example, a bed (or part of a bed), couch, sofa, recliner, seat, chair, or seat.

Nodes 10 may communicate with one another. They may be grouped (not shown) physically or virtually, in one or more networks, such as Private, Community, Public, or Hybrid Clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
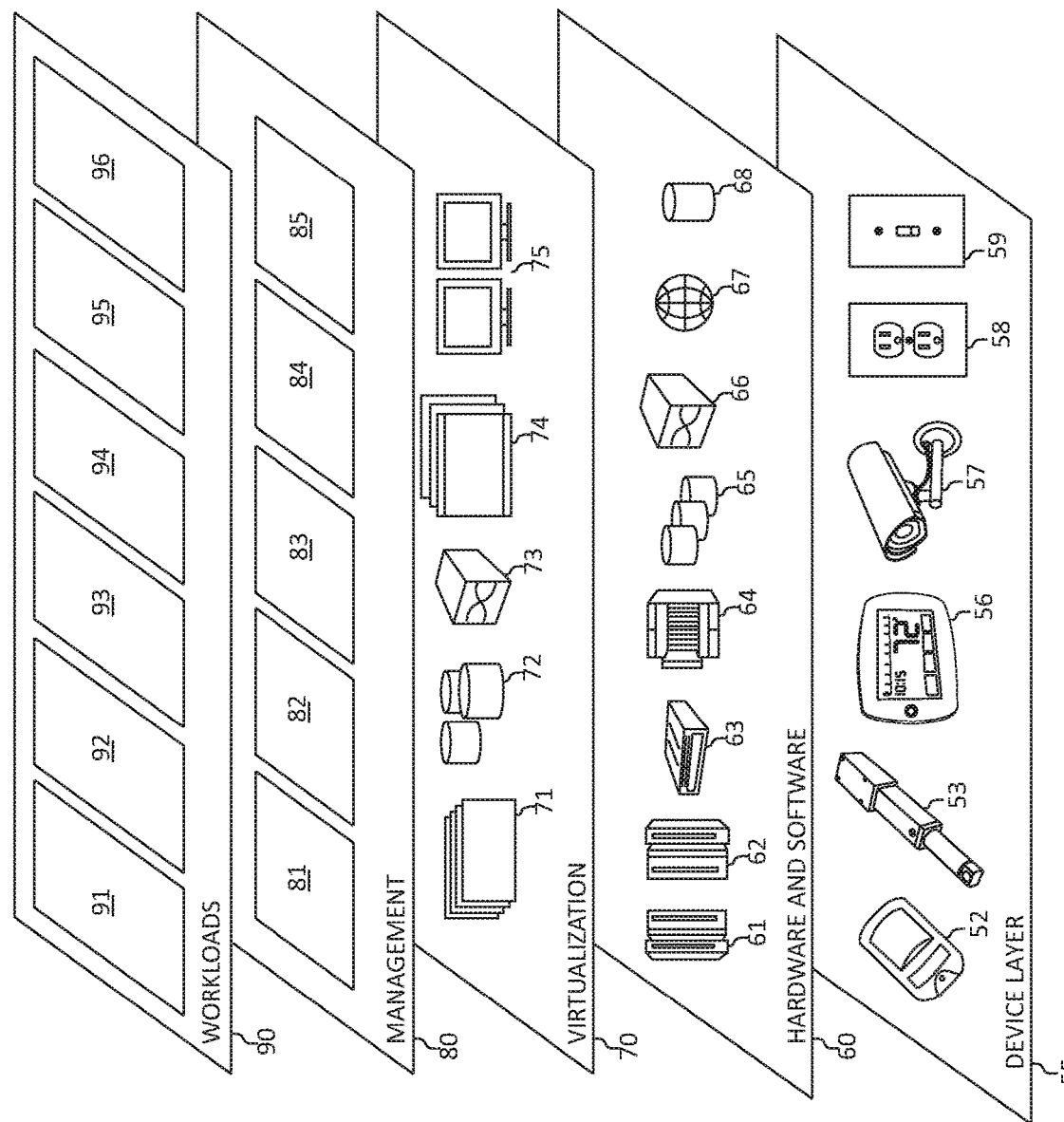
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various network virtualization of UE workloads and functions 96. In addition, configuring settings for various network virtualization of UE workloads and functions 96 may include such operations as data analysis (including data collection and processing from various environmental sensors), semantic analysis, image analysis, control input analysis, device analysis, and/or data analytics functions. One of ordinary skill in the art will appreciate that the configuring settings for various computer-controlled devices using workloads and functions 96 for network virtualization of UE may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the mechanisms of the present invention provide a novel approach for network virtualization of UE in a wireless communication network. A trigger may be received from a UE indicating potential UE mobility away from a remote virtual machine (VM) instance on an edge server collocated on an eNodeB in the wireless communication network. One or more identifiers (ID) of one or more potential edge servers collocated on one or more alternative eNodeBs may be determined for receiving the UE. VM replication may be provided to the one or more potential edge servers to enable continuation of the remote VM instance.

In one aspect, in a cellular network where UEs interact with remote VM instances in the edge network, the present invention provides for moving the remote VM instances as each of the UEs move between edge network elements. In one aspect, a trigger may be received for potential UE mobility away from current point of attachment (e.g., at a current eNodeB). The receiving of the trigger may further include predicting user mobility based on historical patterns, determining a current location, and/or receiving signaling information from adjacent points of attachment. The identifiers (IDs) of the potential points of attachment may be determined. Also, determining the IDs further includes ordering the potential points of attachment according to the likelihood of the user (e.g., equal to and/or greater than a threshold value, percentage, and/or within a defined range of assigned values that indicate a potential UE mobility to the potential point of attachment) moving to said points. For example, if user mobility is modeled using, for example, a Markov Chain, then given the current location of a user, the probability distribution over all possible next or future locations may be computed. All next or future locations may be selected having a probability (or percentage) that may be above a threshold, or a top-k most probable next location may be selected as potential points of attachment. VM replication may be performed to the potential points of attachment.

Figure 4:
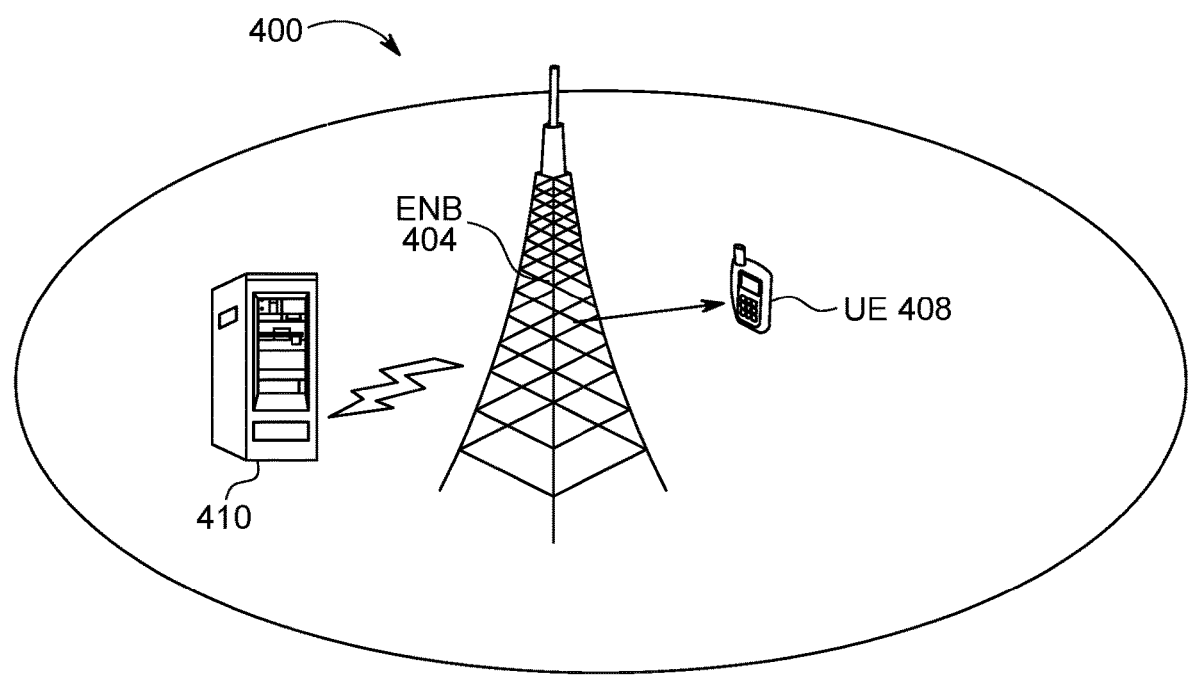
FIG. 4 illustrates a mobile communication network within a cell in accordance with aspects of the present invention.

Turning now to FIG. 4, a mobile communication network within a cell 400 having an evolved node B (eNB) with a mobile device is depicted. FIG. 4 illustrates an eNB 404 that can be associated with an anchor cell, macro cell or primary cell. The mobile communication network may be a radio access network that can cover a geographical area, which can be divided into cell areas (e.g., cell area 400) with each cell area being served by a radio network node referred to as a base station, e.g., a Radio Base Station (RBS), which can be referred to as "eNB", "eNodeB", "NodeB" or "B node".

Cell 400 can include a mobile device, such as, for example, a user equipment (UE or UEs) 408 that can be in communication with the eNB 404. The eNB 404 may be a station that communicates with the UE 408 and may also be referred to as a base station, a node B, an access point, and the like. The eNB 404 can be a high transmission power eNB, such as a macro eNB, for coverage and connectivity. The eNB 404 can be responsible for mobility and can also be responsible for radio resource control (RRC) signaling.

User equipment (UE or UEs) 408 can be supported by the eNB 404. The eNB 404 may provide communication coverage for a particular geographic area. In 3GPP, the term "cell" can refer to a particular geographic coverage area of eNB and/or an eNB subsystem serving the coverage area, depending on the context in which the term is used. In one aspect, a server 410 (e.g., an edge server) may be collocated at eNB 404 along with radio area network (RAN) processing.

Figure 5:
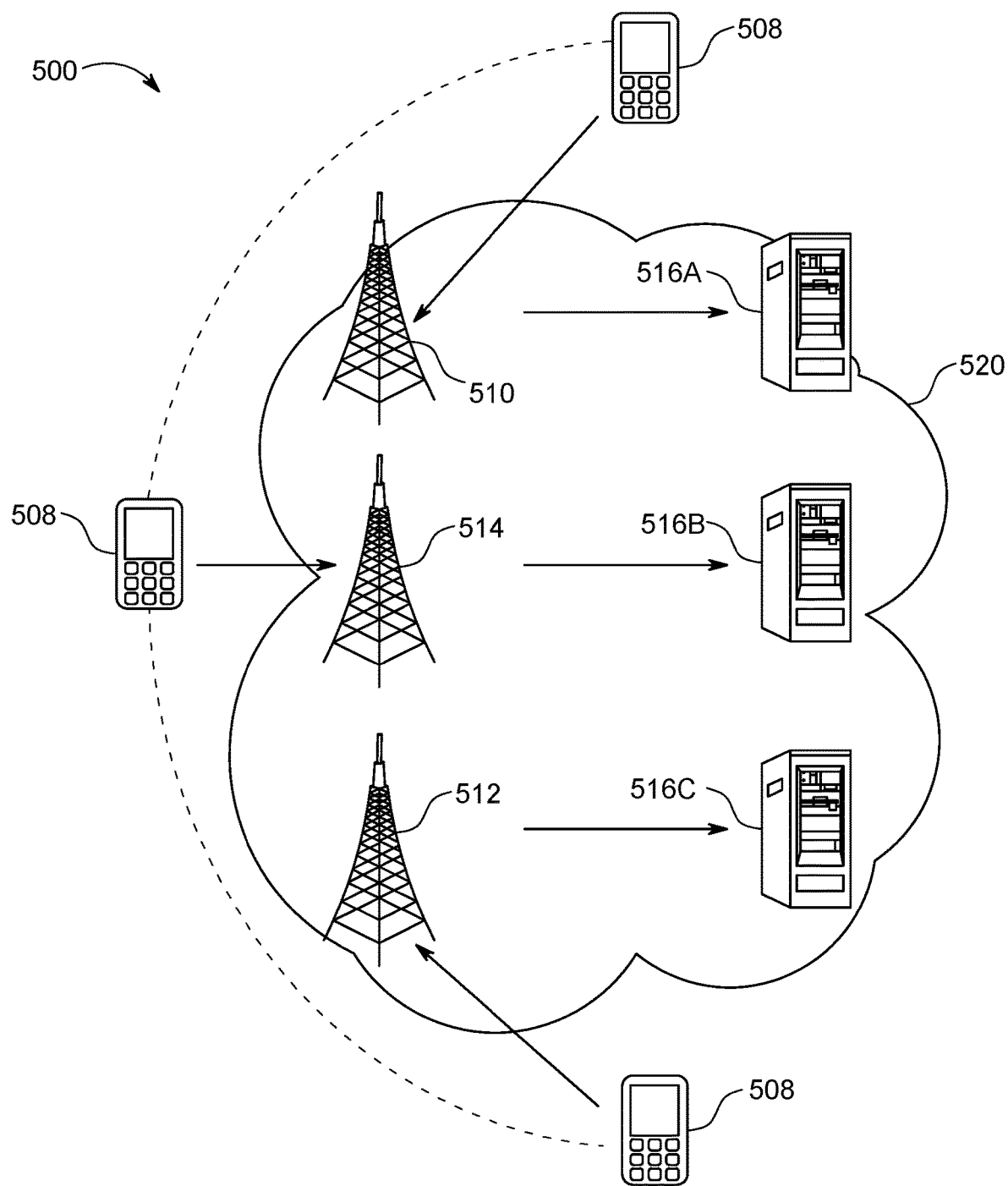
FIG. 5 illustrates a mobile communication network for network virtualization of user equipment (UE) in accordance with aspects of the present invention.

In FIG. 5 a wireless communication system, in particular, a telecommunication network 500 comprising a wireless communication system, is schematically disclosed. It should be noted that the descriptions and embodiments of FIG. 4 can be used in FIG. 5. In one aspect, telecommunication network 500 may include an access subsystem (also named UTRAN or E-UTRAN) and a core network 520 (e.g., the subsystem and core network collectively shown as 520). In one aspect, the telecommunication network 500 (or wireless communication network) may include and/or be associated with a cloud computing environment such as, for example, cloud computing environment 50 of FIG. 2. In one aspect, telecommunication network 500 comprises access apparatuses 510, 512, and 514 that may be in wireless communication with user equipment (UEs) 508. In one embodiment, the telecommunication network 500 may be an access subsystem. In one aspect, telecommunication network 500 can be a 3GPP LTE network and access apparatuses 510, 512, and 514 can be eNodeB apparatuses and/or base station subsystems (BSS), nevertheless the example is not limited to this type of network.

Depending on the type of network, access apparatuses 510, 512, and 514 can be of different types and can be interconnected in different ways. These apparatuses 510, 512, and 514 therefore are not limited to eNodeBs and can comprise any device suitable to provide a wireless connection to UE 508. For example, access apparatuses 510, 512, and 514 can comprise access points, radio base stations, remote radio heads (RRH) and radio network controllers controlling the radio base stations. Each access apparatus 510, 512, and 514 can comprise equipment and one or more antennas. In case the equipment can receive and transmit signals from different antennas, each cell (such as cell 400 of FIG. 4) can be logically divided into a plurality of sub cells, each covered by a given antenna controlled by a common equipment.

In one aspect, apparatuses 510, 512, and 514 can be connected via an interface to a core network (not shown for illustrative convenience), which comprises server(s) and databases for providing services (such as data communications, voice calls, or VoIP calls) to the UE 508. In particular, core network 520 comprises MMEs (Mobility Management Entities) and Gateways for connection with other networks.

In one aspect, access apparatuses 510, 512, and 514 may also be connected to one or more servers 516A-C (e.g., an edge server). Each server 516A-C may be collocated at apparatus 510, 512, and 514 with radio area network (RAN) processing. That is, the one or more servers 516A-C may be located within the apparatus 510, 512, and 514 and/or external to the apparatuses 510, 512, and 514. In short, the one or more servers 516A-C may be in wireless communication with the access apparatus 510, 512, and 514 and/or the UE 508.

Each server 516A-C may be included in a cloud computing environment such as, for example, cloud computing environment 50 of FIG. 2. The cloud computing environment such as, for example, cloud computing environment 50 of FIG. 2 may provide virtualized computing, virtualized storage, virtualized networking and other virtualized services that are executing on a hardware substrate.

In one aspect, the one or more servers 516A-C may provide virtualized computing services (i.e., virtualized computing, virtualized storage, virtualized networking, etc.) to UE 508.

In one aspect, the one or more servers 516A-C may predict the mobility of the UE 508 (e.g., "UE mobility") based on historical mobility patterns from one server to another server of the one or more servers 516A-C. The one or more servers 516A-C may collect historical mobility patterns of the UE 508 from one or more cloud storage systems such as, for example, those described in FIGS. 2-3, that may be in communication with telecommunication network 500.

That is, the one or more servers 516A-C may predict the mobility of the UE 508 based on handover information from one eNodeB to an alternative eNodeB, such as, for example, from access apparatus 510 to access apparatus 512 and/or access apparatus 514. A current server of the one or more servers 516A-C may order the other servers of the one or more servers 516A-C according to a ranking for receiving the UE.

That is, a current server (e.g., server 516A) may analyze UE mobility of the UE 508 based on historical UE mobility data, current UE 508 behavior (e.g., UE 508 is traveling or moving in a particular direction from access apparatus 510 to 514 or 512), and/or positioning data of another server of the one or more servers 516A-C, or other data for ordering the one or more servers 516A-C. The current server (e.g., server 516A) may then estimate or predict a potential server (e.g., access apparatus 512 or 514) of the one or more servers 516A-C for receiving the UE 508. Thus, the current server (e.g., server 516A) may order and predict access apparatus 514 is the next or future attachment point for UE 508 at a predicted or defined time period, and then UE 508 may connect to access apparatus 512 at a later predicted or defined time period after connecting to access apparatus 514.

Upon ordering and predicting the potential server (e.g., server 516B or 516C with server 516A being a current server of the UE 508) of the one or more servers 516A-C for receiving the UE 508, VM migration and/or replication may be performed on the one or more potential servers (e.g., server 516B or 516C) in conjunction with a handover operation of the UE 508 from a current eNodeB to a potential eNodeB such as, for example, current access apparatus 510 to access apparatus 512 and/or access apparatus 514. That is, the handover operation (or "hand off" operation) may be defined as the transfer of service from the source eNB (e.g., access apparatus 510) to the target eNB (e.g., access apparatus 512 or 514). Stated differently, the handover operation may refer to the process of transferring an ongoing call or data session involving a wireless terminal from one node, channel, or radio access technology to another node, channel, or radio access technology. For example, a wireless terminal (e.g., UE 508) participating in an ongoing call or data session handled by a first or source base station (e.g., access apparatus 510) may have the call or session handed over to a second or target base station (e.g., access apparatus 512 and/or 514) when measurements from the wireless terminal indicate that it would be appropriate or beneficial for such handover to occur.

Figure 6:
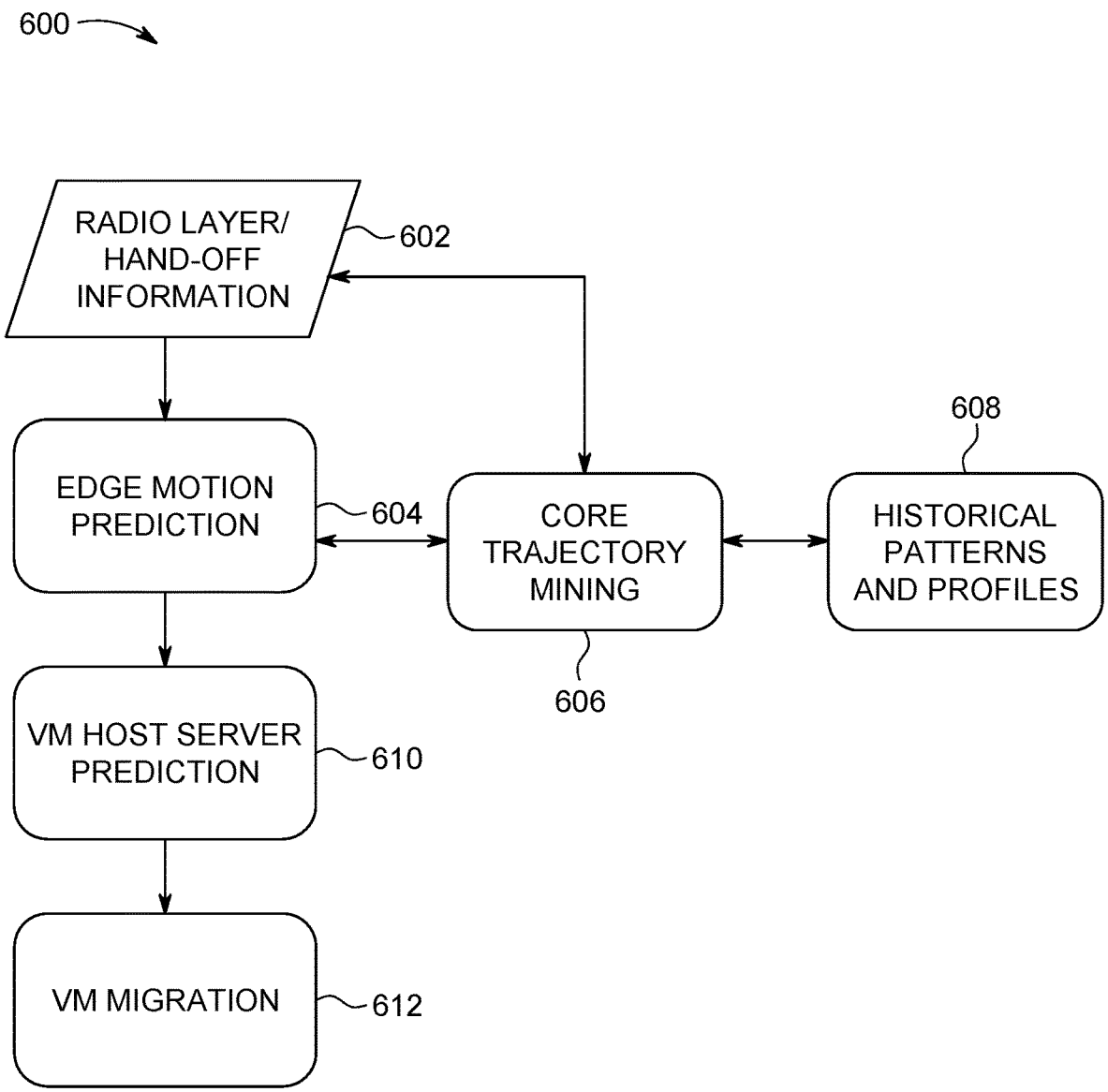
FIG. 6 is a flowchart diagram depicting an exemplary method for network virtualization of user equipment (UE) in accordance with aspects of the present invention.

Turning now to FIG. 6, a method 600 for network virtualization of user equipment (UE) in a wireless communication network is depicted. In one aspect, each of the devices, components, modules, operations, and/or functions described in FIGS. 1-5 also may apply or perform one or more operations or actions of FIG. 6. The functionality 600 may be implemented as a method executed as instructions on a machine, where the instructions are included on at least one computer readable medium or one non-transitory machine readable storage medium. The functionality 600 may start in block 602 by performing a handover (e.g., hand-off) operation using a radio layer with handover information. The radio layer/handover information may include a large or selected amount of information available from a network layer including the cell identifier (ID) and/or received signal strength indicators (RSSI) for making hand-off decisions that could be used to predict user mobility. For example, the RSSI information may be used to determine when a mobile device's connection to an eNodeB is weakening and when the mobile device should be switched to an alternative eNodeB.

Using a cloud computing storage system associated and in communication with the wireless communication network, an edge server associated with an eNodeB may mine a core trajectory from a database in a cloud computing storage system, as in block 606, and receive both historical patterns of a UE and a UE profile, as in block 608. Using the mined data from blocks 606 and 608, edge motion (e.g., user mobility of a UE) may be predicted, as in block 604. A VM host server may be predicted, as in block 610. VM migration (and/or VM replication) may be performed such as, for example, on the predicted VM host server, as in block 612. The functionality 600 may end.

Figure 7:
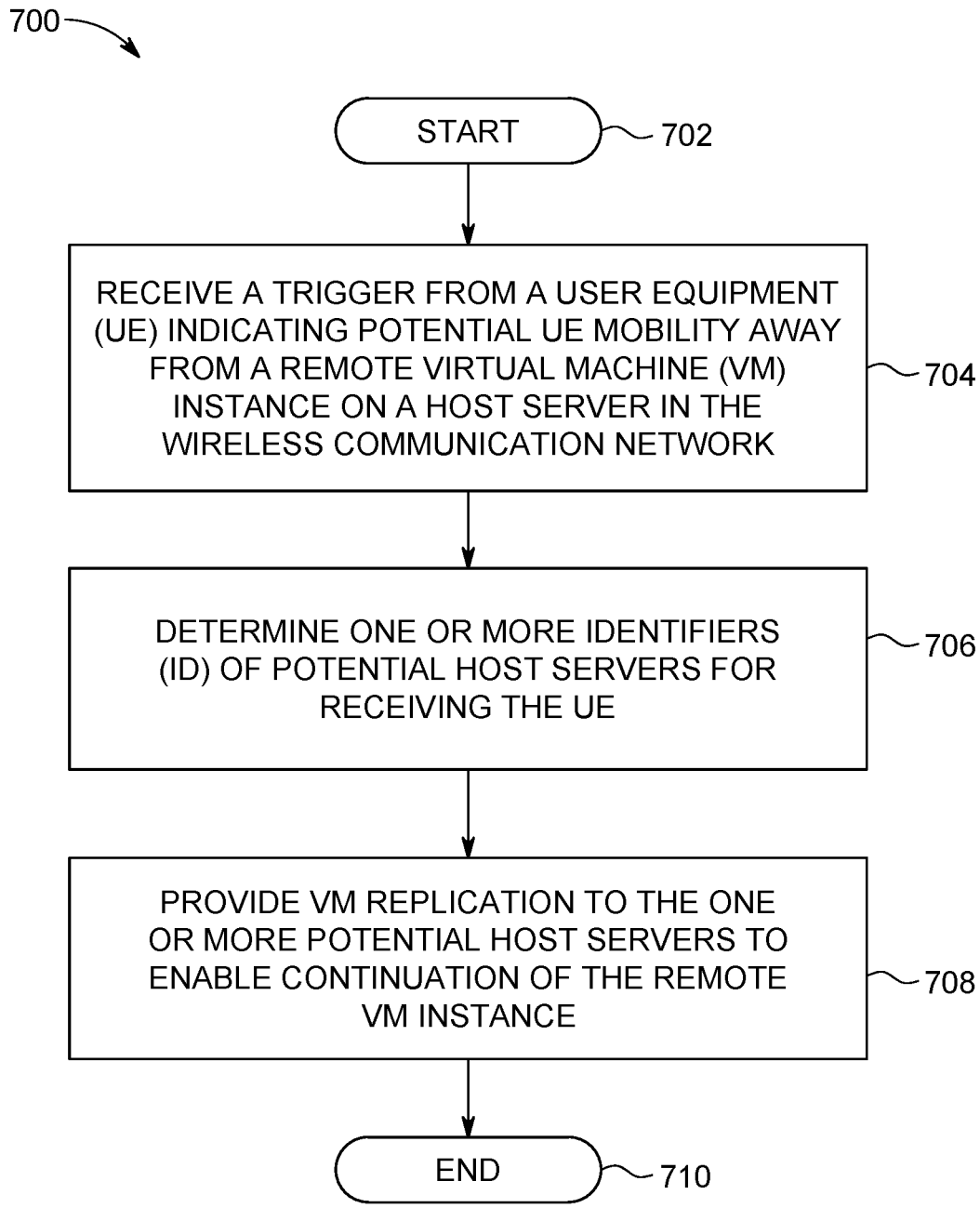
FIG. 7 is an additional flowchart diagram depicting an exemplary method for network virtualization of user equipment (UE) in a wireless communication network, again in which various aspects of the present invention may be realized.

Turning now to FIG. 7, a method 700 for network virtualization of user equipment (UE) in a wireless communication network is depicted. In one aspect, each of the devices, components, modules, operations, and/or functions described in FIGS. 1-6 also may apply or perform one or more operations or actions of FIG. 7. The functionality 700 may be implemented as a method executed as instructions on a machine, where the instructions are included on at least one computer readable medium or one non-transitory machine readable storage medium. The functionality 700 may start in block 702.

A trigger may be received from a user equipment (UE) indicating potential UE mobility away from a remote virtual machine (VM) instance on a host server collocated on an eNodeB in the wireless communication network, as in block 704. One or more identifiers (ID) of one or more potential host servers collocated on one or more alternative eNodeBs may be determined for receiving the UE, as in block 706. VM replication may be provided to the one or more potential host servers to enable continuation of the remote VM instance, as in block 708. The functionality 700 may end, as in block 710.

In one aspect, in conjunction with and/or as part of at least one block of FIG. 7, the operations of method 700 may include each of the following. The operations of method 700 may include predicting the UE mobility based on historical mobility patterns from the host server to the one or more potential host servers, predicting the UE mobility based on handover information from an eNodeB to an alternative eNodeB, and/or ordering the one or more potential host servers according to a ranking for receiving the UE. Each host server in the wireless communication network is an edge server collocated at an eNodeB. The operations of method 700 may include collecting historical mobility patterns of the UE from one or more cloud storage systems. VM migration and/or replication may be performed on the one or more potential host servers in conjunction with a handover operation of the UE from an eNodeB to an alternative eNodeB.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or host servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for network virtualization of user equipment (UE) in a wireless communication network, comprising:
receiving a trigger from a user equipment (UE) indicating potential UE mobility away from a remote virtual machine (VM) instance on a host server in the wireless communication network;
determining one or more identifiers (ID) of potential host servers for receiving the UE; wherein the one or more potential host servers for receiving the UE are predicted prior to receiving a signal from the UE indicating which of the one or more potential host servers is to receive the UE;
providing VM replication to the one or more potential host servers, according to the prediction, to enable continuation of the remote VM instance; and
performing the VM replication on the one or more potential host servers in conjunction with a handover operation of the UE from an eNodeB to an alternative eNodeB; wherein the VM replication is initiated to each of the one or more potential host servers, irrespective of whether the one or more potential host servers includes a plurality of the potential host servers, prior to the UE commencing the handover operation from the eNodeB to the alternative eNodeB.

2. The method of claim 1, further including predicting the UE mobility based on historical mobility patterns from the host server to the one or more potential host servers.

3. The method of claim 1, further including predicting the UE mobility based on handover information from the eNodeB to the alternative eNodeB.

4. The method of claim 1, further including ordering the one or more potential host servers according to a ranking for receiving the UE.

5. The method of claim 1, further including collecting historical mobility patterns of the UE from one or more cloud storage systems.

6. The method of claim 1, wherein each host server in the wireless communication network is an edge server collocated at the eNodeB.

7. A system for network virtualization of user equipment (UE) in a wireless communication network, comprising:
one or more computers with executable instructions that when executed cause the system to:
receive a trigger from a user equipment (UE) indicating potential UE mobility away from a remote virtual machine (VM) instance on a host server in the wireless communication network;
determine one or more identifiers (ID) of potential host servers for receiving the UE; wherein the one or more potential host servers for receiving the UE are predicted prior to receiving a signal from the UE indicating which of the one or more potential host servers is to receive the UE;
provide VM replication to the one or more potential host servers, according to the prediction, to enable continuation of the remote VM instance; and
perform the VM replication on the one or more potential host servers in conjunction with a handover operation of the UE from an eNodeB to an alternative eNodeB; wherein the VM replication is initiated to each of the one or more potential host servers, irrespective of whether the one or more potential host servers includes a plurality of the potential host servers, prior to the UE commencing the handover operation from the eNodeB to the alternative eNodeB.

8. The system of claim 7, wherein the executable instructions further predict the UE mobility based on historical mobility patterns from the host server to the one or more potential host servers.

9. The system of claim 7, wherein the executable instructions further predict the UE mobility based on handover information from the eNodeB to the alternative eNodeB.

10. The system of claim 7, wherein the executable instructions further order the one or more potential host servers according to a ranking for receiving the UE.

11. The system of claim 7, wherein the executable instructions further collect historical mobility patterns of the UE from one or more cloud storage systems.

12. The system of claim 7, wherein each host server in the wireless communication network is an edge server collocated at the eNodeB.

13. A computer program product for, by a processor, network virtualization of user equipment (UE) in a wireless communication network, the computer program product comprising a non-transitory computer-readable storage medium having computer-readable program code portions stored therein, the computer-readable program code portions comprising:

an executable portion that receives a trigger from a user equipment (UE) indicating potential UE mobility away from a remote virtual machine (VM) instance on a host server in the wireless communication network;

an executable portion that determines one or more identifiers (ID) of potential host servers for receiving the UE; wherein the one or more potential host servers for receiving the UE are predicted prior to receiving a signal from the UE indicating which of the one or more potential host servers is to receive the UE;

an executable portion that provides VM replication to the one or more potential host servers, according to the prediction, to enable continuation of the remote VM instance; and an executable portion that performs the VM replication on the one or more potential host servers in conjunction with a handover operation of the UE from an eNodeB to an alternative eNodeB; wherein the VM replication is initiated to each of the one or more potential host servers, irrespective of whether the one or more potential host servers includes a plurality of the potential host servers, prior to the UE commencing the handover operation from the eNodeB to the alternative eNodeB.

14. The computer program product of claim 13, further including an executable portion that predicts the UE mobility based on historical mobility patterns from the host server to the one or more potential host servers, wherein each host server in the wireless communication network is an edge server collocated at the eNodeB.

15. The computer program product of claim 13, further including an executable portion that predicts the UE mobility based on handover information from the eNodeB to the alternative eNodeB.

16. The computer program product of claim 13, further including an executable portion that orders the one or more potential host servers according to a ranking for receiving the UE.

17. The computer program product of claim 13, further including an executable portion that collects historical mobility patterns of the UE from one or more cloud storage systems.

* * * * *